Sept. 20, 1971    J. P. K. FONTAINE ET AL    3,606,384
SLIDE MOUNT FOR FIFTH WHEELS
Filed May 18, 1970    2 Sheets-Sheet 1
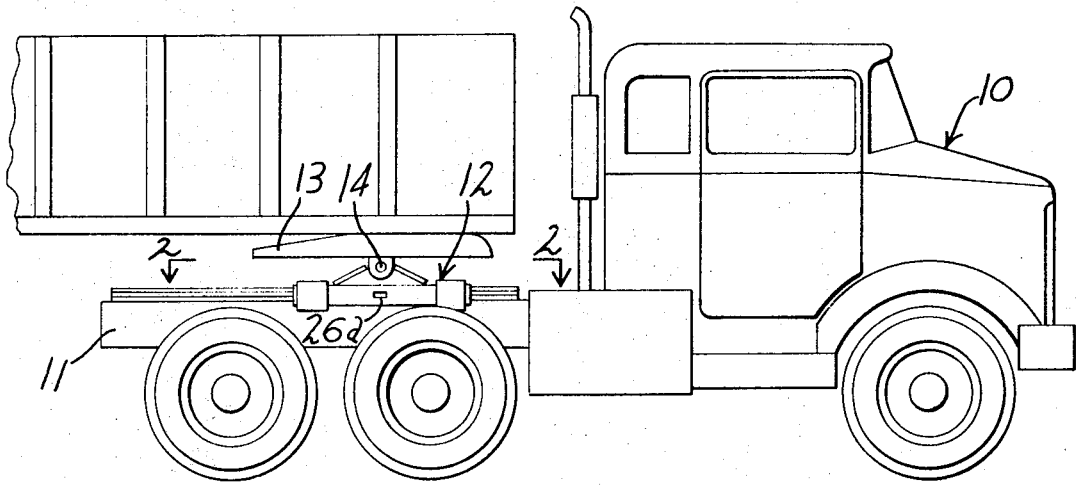
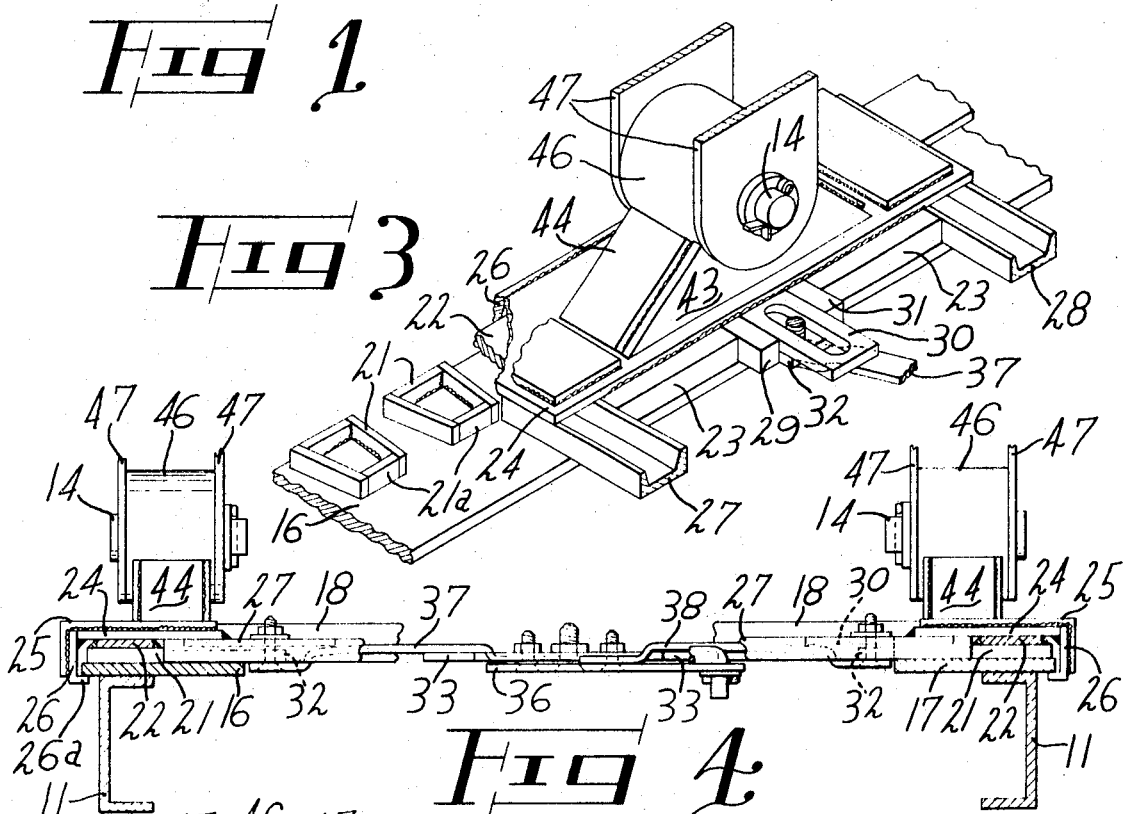
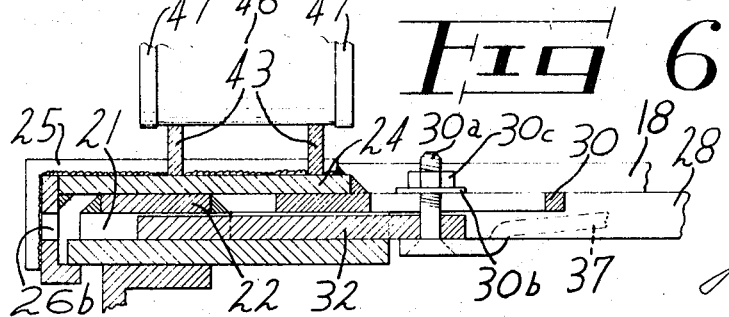
INVENTOR.
John P. K. Fontaine
BY William D. Benson
Jennings Carter & Thompson
Attorneys

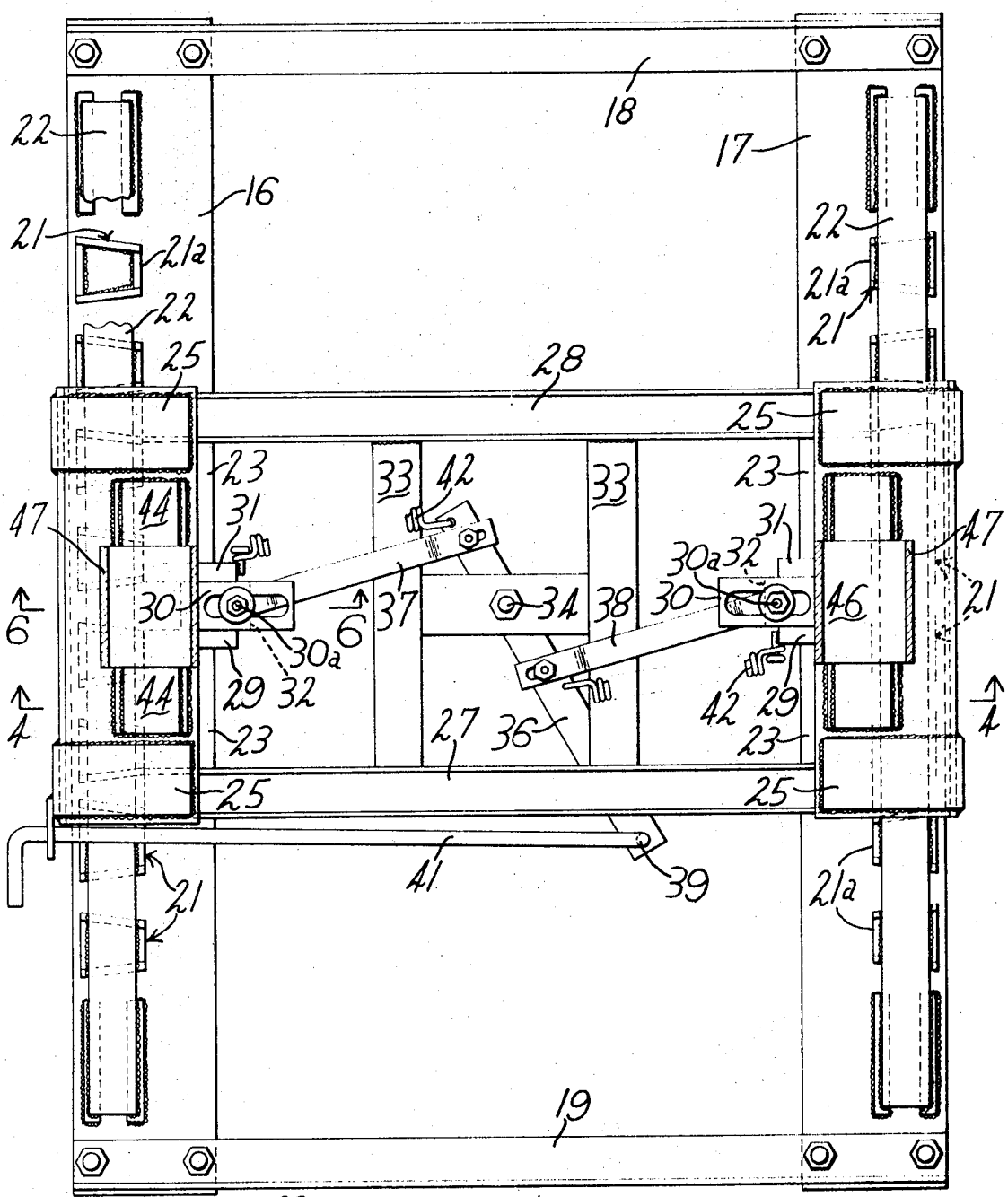
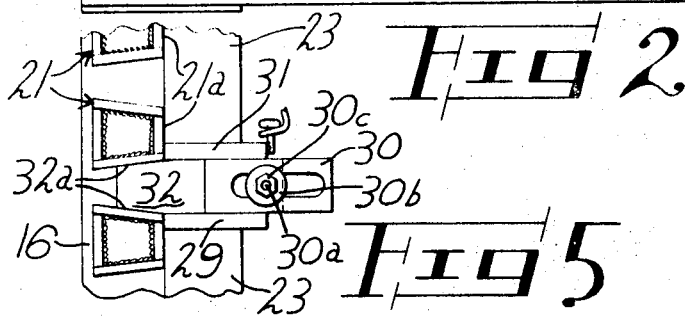
Fig 2.
Fig 5
INVENTOR.
John P. K. Fontaine
William D. Benson
BY
Jennings Carter & Thompson
Attorneys United States Patent Office 3,606,384
Patented Sept. 20, 1971

3,606,384
SLIDE MOUNT FOR FIFTH WHEELS
John P. K. Fontaine, Box 784, Rte. 11, Birmingham, Ala. 35210, and William D. Benson, Birmingham, Ala.; said Benson assignor to said John P. K. Fontaine
Filed May 18, 1970, Ser. No. 37,991
Int. Cl. B62d 53/06
U.S. Cl. 280—407    7 Claims

ABSTRACT OF THE DISCLOSURE

A slide mount for fifth wheels having a base frame mounted on the tractor and a slide mounted on the base frame and which carries the fifth wheel. The base frame rails carry individually formed spaced apart retainers providing tapered pockets to receive locking members, the locking members being carried by the slide and being spring biased to locking positions and operatively connected to a common handle for withdrawing them to free the slide for fore and aft movement.

Our invention relates to slide mounts for fifth wheels and has for its principal object to provide a slide mount which may be completely fabricated of plates, angles, channels and the like, secured together by welding, the construction being such that the parts and the slide as a whole are considerably stronger than prior art devices, yet lighter in weight and lower in height.

Another object is to provide a slide for fifth wheels in which the slide itself is held captive against vertical movement on the base by means of inturned plates or angle members on the slide which fit under the longitudinally disposed rails of the base, together with individually formed members secured to the rails, adjacent the outer edges thereof, and which are spaced apart to form tapered locking means for the wedges.

A more general object is to provide a slide mount for fifth wheels which is strong and light in construction and which permits the attaching position for the fifth wheel mounting means to be lowered, thereby to lower the fifth wheel height and allow for the maximum cube trailer within permissible legal limits.

Apparatus illustrating features of our invention is shown in the accompanying drawings in which:

FIG. 1 is a fragmental side elevational view of a tractor and portion of a trailer showing our improved slide and fifth wheel mounted thereon;

FIG. 2 is an enlarged detail sectional view taken generally along line 2—2 of FIG. 1, certain parts being broken away and in section;

FIG. 3 is a fragmental detail perspective view with certain parts broken away and illustrating a portion of one of the base rails and one of the locking wedges;

FIG. 4 is a detail sectional view taken generally along line 4—4 of FIG. 2;

FIG. 5 is a fragmental detail plan view showing one of the locking members engaged between an adjacent pair of which receive the locking members; and, FIG. 6 is an enlarged detail fragmental sectional view taken generally along line 6—6 of FIG. 2.

Referring now to the drawings for a better understanding of our invention we show in FIG. 1 a tractor 10 having a rear frame 11. Our improved slide is indicated generally by the numeral 12 and the fifth wheel by the numeral 13. As will be understood, the fifth wheel is pivotally mounted on the slide proper on horizontally disposed heavy pins or the like 14. The side rails of the base of our improved slide 12 are secured to the framework 11 of the truck in any suitable manner.

Referring to FIGS. 2, 3 and 4 it will be seen that our improved apparatus comprises the lower rails 16 and 17 which form the base of the device. These rails are cross connected by members 18 and 19 as illustrated.

Secured to the top surfaces of the rails 16 and 17, along the outer surfaces thereof are individually formed, spaced members 21. These members may comprise pieces of barstock cut to length to form the shape shown and welded to the surface of the rails 16 and 17. It will further be seen that the sides of the members 21, relative to each other, provide outwardly converging pockets or recesses, and these are adapted to receive the locking members or wedges which lock the slide, as presently to be described, to the base. A plate 22 is welded to the top surfaces of the members 21 and extends the full length thereof, thus to form tops or covers for the spaces between the members 21 into which the wedges will enter as will be explained. It is important to note that the members 21 are thus welded to rails 16 and 17 and to the cover plates 22 and that the ends 21a of the members 21 project just inwardly of the inner edges of the cover plates 22.

At each side the slide proper may comprise lower plates 23 of a width to slide on the plates 16 and 17, along the upper surfaces thereof inwardly of the members 21. The slide further comprises a second plate 24, secured by welding to plates 23. The plate 24 has downwardly disposed portions 26 and inwardly turned portions 26a which underlie the outer edges of the plates 16 and 17, thus captively to hold the slide against vertical movement relative to the base. The portions 26 and 26a are strengthened by welding angles 25 to the upper surface of plates 24 and depending portions 26. Also, at 26b, in lateral alignment with the outer ends of the locking members or wedges we provide holes in the plate portions 26 to permit grease and dirt to be pushed out when the wedges move to locking position. These holes also permit a tool to be inserted against the outer ends of the locking members to drive them inwardly in case they become locked, if damaged.

The plates 24 are cross braced by channel members 27 and 28, which underlie the plates 24 and are welded adjacent their ends to the plates 23 and 24.

It will be noted that the plates 23 are spaced apart adjacent their centers to provide for the insertion and permanent securing of guide members 29 and 31. Thus, the guide members 29 and 31 are welded to the plates 23.

Mounted between the guides 29 and 31, for rectilinear movement therein are locking members 32. As shown best in FIG. 5 the locking members are tapered as at 32a, thus to fit snugly against the tapered walls of the members 21. With the slide in place on the base and with the locking members 32 in their outermost positions, the slide is held against fore and aft movement relative to the base. Further, the locking members are guided in their in and out movement by slotted plates 30 and studs 30a with washers 30b and nuts 30c.

The cross channels 27 and 28 are connected adjacent their centers by fore and aft extending plate members 33. Pivotally mounted as at 34 to a cross plate is a bar 36. The bar 36 carries pivotally mounted links 37 and 38, pivotally connected to the studs 30a as shown.

Pivotally mounted to one end of the bar 36 as at 39 is an operating handle 41. A pair of springs 42, anchored at one end to the guides 29 and 31 and at their other ends to the bar 36 bias the locking members 32 toward locking position.

Welded to the upper surfaces of each of the plates 24 are built up structures each comprising vertical plates 43 and a horizontal, sloping plate 44. A cylindrical bearing member 46 is secured to this structure at its center and the pins 14 pass through the bearing member 46 and depending lugs 47 carried by the fifth wheel itself, thus to pivotally mount the fifth wheel on the slide.

From the foregoing the advantages and operation of our improved fifth wheel slide may now be more fully explained. First, it will be noted that our design greatly reduces the weight of the slide over prior art slides while at the same time greatly increasing its overall strength. Further, by providing the members 21, individually formed and individually secured to the top surfaces of the rails 16 and 17, along the outer portions of the top surfaces thereof, we provide room for the plates 23 to slide immediately along and in contact with the inner ends of the members 21. Side or sway loads imposed on the slide through the fifth wheel thus are transmitted to the base rails through the members 21, these members therefore performing a dual function. Further, since in practice these lateral or side loads are considerably greater, by welding the cover plates 22 to the tops of the members 21, a strong unitary structure is provided.

It will be seen that by pulling the handle 41 outwardly the bar 36 is pivoted about the point 34, withdrawing the locking member 32 rectilinearly relative to their guides 29 and 31, tensioning the springs 42. The slide may then be moved relative to the base and upon releasing the handle, even if the locking members are not lined up with the recesses between the members 21, further slight movement of the slide permits the springs 42 to snap the locking members into place, again securing the slide to the base in the new fore and aft selected position. Our invention is particularly characterized by the fact that our slide, while extremely strong for its weight, is lower and shorter than prior slides while still permitting adequate rocking action of the fifth wheel about its pivot pins 14. We thus provide a slide in which the locking members are directly beneath the pins 14, while still maintaining an extremely low height and minimum fore and aft dimensions. Also, since the slide rests on the cover plates 24 as well as on the rails 16 and 17, we provide a considerable increase in bearing area for the slide.

While we have shown our invention in but one form, it will be obvious to those skilled in the art that it is not so limited, but is susceptible of various other changes and modifications without departing from the spirit thereof.

What we claim is:
1. In a slide mount for fifth wheels,
   (a) a base having a pair of side rails disposed to be affixed to a vehicle,
   (b) a slide adapted to carry a fifth wheel and embodying plates disposed to slide along the inner top surfaces of the rails,
   (c) said slide also having side plates with downturned and thence inturned edges located beneath the outer edges of the rails, whereby the slide is held against vertical movement relative to the rails,
   (d) individually formed spaced members secured to the upper surfaces of the rails outwardly of the areas thereof on which the plates set forth in (b) above slide and providing pockets disposed to receive locking members,
   (e) locking members carried in guideways on the slide and disposed for transversely directed rectilinear movement into and out of said pockets, thereby to lock or unlock the slide from the base,
   (f) a common operator for moving the locking members from locked to unlocked position, and
   (g) means biasing the locking members toward locking position.
2. Apparatus as defined in claim 1 in which the slide is held against lateral movement relative to the rails by means of plates carried by the slide, the outer edges of which plates fit snugly but slidably between the inner ends of said spaced members.
3. Apparatus as defined in claim 1 in which said spaced members comprise metal bars welded to the upper surfaces of the rails.
4. Apparatus as defined in claim 1 in which there is a cover plate extending over the tops of said spaced members, said cover plate being welded to said spaced members.
5. Apparatus as defined in claim 1 in which there are holes in the downturned edges of said side plates in lateral alignment with the ends of the locking members, thereby to permit grease, dirt and the like to be pushed from between the spaced members by the locking members and providing access to the ends thereof for driving them inwardly if they cannot be moved by said common operator.
6. Apparatus as defined in claim 1 in which the slide is provided adjacent its sides with bearing members adapted to pivotally connect with a fifth wheel.
7. Apparatus as defined in claim 1 in which there are cover plates extending over the tops of said spaced members and welded thereto, said slide resting slidably on said cover plates and said inner top surface of said rails, thereby increasing the bearing area on which the slide moves.

References Cited
UNITED STATES PATENTS

| 2,750,207 | 6/1956 | Greenway | 280—407 |
| 2,854,250 | 9/1958 | Smith | 280—407 |
| 2,985,463 | 5/1961 | Geerds | 280—407 |
| 3,170,716 | 2/1965 | Walther et al | 280—407 |

LEO FRIAGLIA, Primary Examiner

U.S. Cl. X.R.

280—80-B